United States Patent
Pollard et al.

[19]

[11] Patent Number: 5,945,193
[45] Date of Patent: Aug. 31, 1999

[54] TOUCH FASTENER WITH POROUS METAL CONTAINING LAYER

[75] Inventors: Samuel White Pollard, Durham; Donald L. Banfield, Hudson; Peter E. Leach, Hooksett; Carol A. Watts, Pembroke; Lawrence E. Lacombe, Goffstown, all of N.H.

[73] Assignee: Velcro Industries B.V., Curacao, Netherlands Antilles

[21] Appl. No.: 08/568,010

[22] Filed: Dec. 6, 1995

[51] Int. Cl.⁶ .................................... B32B 3/06
[52] U.S. Cl. .................... 428/100; 24/306; 24/442; 24/445; 24/447; 24/448; 24/450; 24/452; 428/99; 428/137; 428/138; 428/255; 428/285; 428/313.9; 428/474.4; 428/480
[58] Field of Search .................... 428/100, 99, 137, 428/138, 255, 67, 285, 313.9, 474.4, 480; 24/442, 306, 445, 447, 448, 450, 452

[56] References Cited

U.S. PATENT DOCUMENTS

| | | | |
|---|---|---|---|
| 3,983,278 | 9/1976 | Wardle | 428/92 |
| 4,180,890 | 1/1980 | Brumlik | 24/204 |
| 4,563,380 | 1/1986 | Black et al. | 428/100 |
| 4,673,542 | 6/1987 | Wigner et al. | 264/46.7 |
| 4,693,921 | 9/1987 | Billarant et al. | 428/100 |
| 4,710,414 | 12/1987 | Northrup et al. | 428/43 |
| 4,746,389 | 5/1988 | DiGenova | 156/247 |
| 4,802,939 | 2/1989 | Billarant et al. | 156/155 |
| 4,814,036 | 3/1989 | Hatch | 156/245 |
| 4,881,997 | 11/1989 | Hatch | 156/66 |
| 4,931,344 | 6/1990 | Ogawa et al. | 428/100 |
| 4,933,224 | 6/1990 | Hatch | 428/100 |
| 4,993,035 | 2/1991 | Billarant et al. | 156/155 |
| 5,061,540 | 10/1991 | Cripps et al. | 428/100 |

(List continued on next page.)

FOREIGN PATENT DOCUMENTS

| | | |
|---|---|---|
| 0 464 754 A1 | 1/1992 | European Pat. Off. . |
| 0 621 118 A1 | 10/1994 | European Pat. Off. . |
| 2047243 | 3/1971 | France . |
| 2405123 | 5/1979 | France . |
| 2463870 | 2/1981 | France . |

OTHER PUBLICATIONS

"Hook–and–Loop Metal Fastener," NASA Tech Briefs, Jun. 1994.

"Fatigue–Resistant Metal Hook–and–Loop Fastener," NASA Tech Briefs, Jun. 1994.

*Primary Examiner*—Nasser Ahmad
*Attorney, Agent, or Firm*—Fish & Richardson P.C.

[57] ABSTRACT

A fastening component of a separable fastener has some portion that is necessary for its fastening function, such as the space adjacent the fastening elements, the base to which the fastening elements are attached or a substrate that is used for another purpose, comprised of a magnetically attractive or electrically conductive porous metal containing layer. The fastening component may be the hook portion or the loop portion of a typical fastener. The fastening elements and the base may be unitary, or of different precursors. The porous metal layer may be embedded in the base portion of the fastening component, or any backing substrate, or therebetween. The porous metal layer may be fully or partially embedded. The porous metal may be an expanded, perforated, woven or non-woven structure. Rather than the magnetically attractive porous metal layer being incorporated into the fastening elements or their base, it may be incorporated into the substrate that is formed from a precursor element that is separate from the base, and that is joined to the base. The porous metal layer may also be located between the fastening elements, such as the hooks or loops, and a protective cover, part of whose function is to prevent foaming material from fouling the fastening elements. The porous metal containing layer may be wholly metal, or it may be a composite of a non-metal phase and a metal phase. Rather than using a separate substrate layer for anchoring such a fastener into a molded article being molded, a three-dimensional pattern may be embossed on the non-fastening surface of the fastener to aid in securing it to the molded article.

23 Claims, 11 Drawing Sheets

U.S. PATENT DOCUMENTS

| | | | |
|---|---|---|---|
| 5,110,649 | 5/1992 | Morse et al. | 428/100 |
| 5,180,618 | 1/1993 | Kessler et al. | 428/100 |
| 5,260,015 | 11/1993 | Kennedy et al. | 264/167 |
| 5,286,431 | 2/1994 | Banfield et al. | 264/134 |
| 5,292,468 | 3/1994 | Colombani | 264/130 |
| 5,422,156 | 6/1995 | Billarant | 428/100 |
| 5,500,268 | 3/1996 | Billarant | 428/100 |
| 5,518,795 | 5/1996 | Kennedy | 428/100 |
| 5,620,769 | 4/1997 | Wessels et al. | 428/100 |

TOUCH FASTENER WITH POROUS METAL CONTAINING LAYER

BACKGROUND

The present invention relates to touch fasteners in general, and more specifically, to touch fasteners with metal constituents. The touch fasteners may be used for incorporation by molding into molded articles, or as part of systems requiring electromagnetic field shielding, or grounding.

Hook and loop type separable touch fasteners, such as those sold under the trademark Velcro®, are well-known and are used to join two members detachably to each other. This type of fastener has two components. Each has a flexible base material having one component of the fastening system on a fastening surface thereof. One component is typically comprised of resilient hooks while the other is comprised of loops, and when the two surfaces are pressed together they interlock to form a releasable engagement.

Separable fasteners are used in the manufacture of automobile seats in the attachment of an upholstered seat cover to a polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the foam mold for incorporation in the bun surface typically comprises the hooked portion of a separable fastener. This hook portion is characterized by a base carrying resilient hooks on a fastening surface. The opposite, non-fastening surface of the base may carry anchor projections to become incorporated into the foam to provide stable attachment of the separable fastener assembly to the foam article. It is also common for a backing layer or substrate to mate with the non-fastening face of the base. The substrate may be of a material that is more conducive to handling of the component or its adherence to other articles. Alternatively, the backing layer may be looped fabric, to which the foam material adheres well. Anchor projections may also project from the substrate. Further, other components can be sandwiched between the substrate and the base.

A protective layer, such as a thin plastic film, may be placed over the resilient hooks, to prevent incursion of foam into the hooks during the molding process, since significant foam contamination of the hooks would affect their ability to engage with the mating portion of the fastener attached to the seat cover. Alternatively, an elastomeric cover that intimately surrounds the hooks, except for a small portion at their tips, can also be used. After the molded article is fabricated and removed from the mold, the elastomeric material is removed.

In some assemblies, a magnetically attractive solid metal shim is attached to the base to facilitate placement of the assembly in a valley (also known as a trench or trough) or on a pedestal in the mold cavity wall, which is equipped with magnets. The shim helps secure the hook-carrying face of the component tightly against the mold wall, thereby further minimizing incursion of the foam into the hooks. The assemblies may be referred to as "mold-in" fasteners or assemblies, due to their use in such molded products.

The solid shim can be incorporated into different locations in the assembly. It can be sandwiched between the hook carrying base and a substrate or backing layer, either temporary or permanent. It can be located centrally relative to the width of the hook-carrying base, or along its marginal edges. In cases where a thin plastic film is used to cover the hooks, the solid shim can be sandwiched between the plastic sheet and the hooks.

As mentioned above, it is also known to substantially cover the hook region with an elastomeric material that protects the hooks against incursion of the foam. It is known to include a magnetic attractant in this elastomeric material.

Known methods of adhering the protective film cover to the hook-carrying component include to use a long bead of hot melt adhesive there between. It is also known to include a magnetic attractant in this hot melt material.

The known methods all have drawbacks. With regard to the solid metal shim itself, it presents an extra component and an extra manufacturing step, thereby contributing to the cost of the assembly and the time for manufacturing a given length of material. The solid metal shim also contributes to the weight of the material. In the construction process, care must be taken that workers are not cut by the solid metal strips. The solid metal limits the flexibility of the strip, and consideration must be taken of the thermal expansion and contraction properties of the various binders and additional layers that might be used to secure the strip to the substrate. It is also often difficult to adhere the solid metal shim to the fastener material or to a separate backing layer, requiring adhesives or other methods.

Considering those known assemblies that use either the protective plastic or the elastomeric cover to contain the solid metal shim, or a magnetic attractant, there are reasons to eliminate these protective covers, if possible. The protective covers also entail additional steps, in their manufacture, attachment to the fastener assembly, and removal from the fastener assembly after molding. All protective material must be removed from the hooks (or loops, if it be the loop carrying component molded into the article), or else the hooks (or loops) will not be exposed to fasten to the mating component. These extra steps must typically be conducted away from a normal high speed production line and contribute to the cost of the fastener assembly, the time for its manufacture, and also generate a relatively large volume of essentially waste material. Additionally, sometimes a residue from the cover material remains on the fastening component after removal, which is undesirable.

When a solid metal shim is used between the base and the foam, some means must be had to secure the shim to the base and the base plus shim assembly to the backing layer or foam, if no backing layer is used. Such means include adhesives, which also entail extra steps, expense, and complications.

Use of a separate substrate for anchoring or securing the fastening component to a foam product, if that is to be its use, also has undesirable effects. It requires an additional piece to be used, contributing to the cost, weight, expense and time involved in making the part. It also increases the inventory that must be kept on hand for manufacturing purposes, and the amount of machinery required to manufacture the components.

Thus, there is a great need for a touch fastener assembly that can be molded into a molded product, without the use of solid metal shims or protective covering for the fastener components. There is also a need to simplify the manufacture of such mold-in assemblies, to minimize their cost, production time, and the time to prepare the molded product for use. It is thus an object of the invention to facilitate a simple means for providing a magnetic attractability to the mold-in fastener assembly. It is another object of the invention to provide a light weight mold-in assembly that does not require a solid metal shim or protective covering for the fastener components, such as hooks. It is another object of the invention to easily attach the base of a fastener component to an anchoring backing layer, while also providing a magnetic attractability. Yet another object of the invention is to provide a magnetic attractability, and also to facilitate securing the fastening component to an article being molded, without using a separate substrate or anchor layer.

In addition to the uses described above, fastener products are also useful in situations where electromagnetic shielding, or grounding or interaction of some sort is required. For instance, it may be advantageous to include a grounding component in separable fastener strips that are used cable ties to secure a bundle of electrical cables together or to fixtures. Further, airplanes typically have areas on the wings or bodies that are covered with an expanded metal sheet, to act as a lightning strike and dissipater. These sheets are typically attached using epoxy or adhesives, and are essentially permanent once attached. It may be desirable to provide such a lightning strike that is selectively removable, such as using a separable fastener.

The important feature of these products is that they contain an electrically conductive metal phase distributed throughout the region over which the product is deployed, and that the component be removable in a non-destructive, relatively simple manner.

Thus, there is also a need for a fastener product that contains an electrically conductive metal phase, which is flexible and lightweight and easily attachable and detachable from a body without destroying the body and without requiring adhesives.

SUMMARY

According to one embodiment, the invention is a component of a two component separable fastener, the component comprising: a base comprising: an extent along a first dimension and an extent along a second dimension; and a fastening surface and a non-fastening surface. Carried on the fastening surface of the base is a plurality of fastening elements. A porous metal containing web is connected to the base, that is substantially coextensive with a significant fraction of the extent of the base along the first dimension of the base.

The porous metal containing web may be substantially embedded within the base, or it may be adhered to the non-fastening surface of the base. Its structure may be woven, non-woven fibrous, screen like, solid with portions removed, or expanded metal, which may be flattened.

The long dimension of the fastening component may be straight or a non-straight curve.

There may be a separate anchor substrate adhered to the non-fastening face of the base, and the metal containing layer may be laminated between the two. The anchor substrate may be a fabric, or it may be a thermoplastic, and the metal containing layer may be embedded within the anchor substrate, wholly or partially.

The porous metal containing web may be wholly metal, or it may be a composite of a non-metal phase with a metal phase distributed throughout, such as a polymeric matrix in which a metal powder is distributed.

The metal may be magnetically attractable, or electrically conductive, or both. If it is magnetically attractable, the metal may be used to help to hold the fastening component in place in a mold equipped with a magnet during the molding of an article to which the fastener is to be attached. If the metal is electrically conductive, the fastening component may be used in situations where electrical shielding or grounding is required.

The non-fastening surface of the base may carry a three-dimensional pattern or a chemical coating for enhancing the adherence of the base to any molded article into which the fastening component is to be molded.

Rather than the metal containing layer being adhered to or embedded within a base layer, if the fastening component is the type having a protective cover secured to the fastening face of the base, the metal containing layer may be located between the protective cover and the fastening face of the base.

The metal may be any of the structures discussed above.

According to another preferred embodiment, the invention is a method for making a component of a two component separable fastener, the method comprising the steps of providing a sheet-form base component, comprising: an extent along a first dimension and an extent along a second dimension; and a fastening surface and a non-fastening surface. A sheet-form porous metal containing web is also provided. The porous metal containing web is contacted to the non-fastening surface of the base and the porous metal containing web is joined to the base.

The joining step may comprise a laminating step. It may also comprise a step that substantially embeds the porous metal containing web within the base, substantially between the fastening surface and the non-fastening surface. This joining step may be conducted between two rollers.

As an additional step, a three-dimensional pattern may be imparted to the non-fastening surface of the base component, such as by embossing.

The metal may be magnetic or electrically conductive. The metal phase may be an expanded metal, and it may have been stretched before the joining step.

According to still another preferred embodiment, the invention is a component of a two component separable fastener, the component comprising a base comprising: an extent along a first dimension and an extent along a second dimension; and a fastening surface and a non-fastening surface. Carried on the fastening surface of the base is a plurality of fastening elements. Carried on the non-fastening surface of the base is a three-dimensional pattern that is integral with the material from which said base is formed. For instance, the pattern can be embossed into the thermoplastic of the base.

Yet another preferred embodiment of the invention is a method for making a component of a two component separable fastener. The method comprising the steps of providing a sheet-form base component, comprising an extent along a first dimension and an extent along a second dimension; and a fastening surface and a non-fastening surface. A three-dimensional pattern is imparted to the non-fastening surface of the base.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
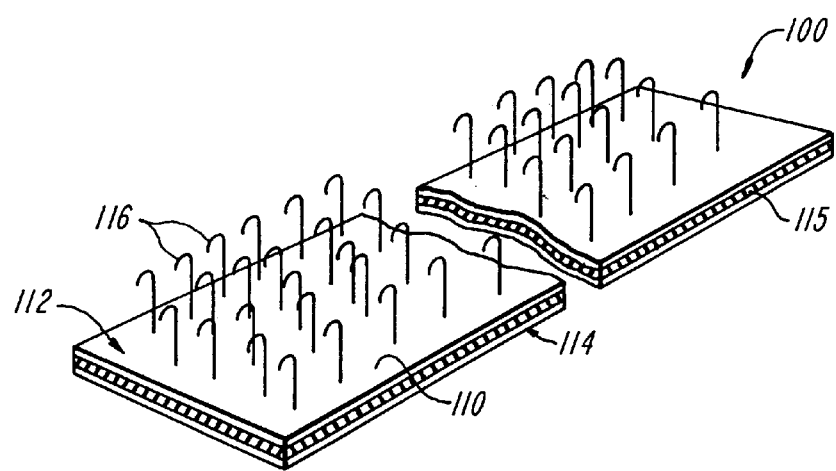
FIG. 1 is a schematic perspective view of an embodiment of a fastening component of the invention, where the fastening elements are hook-type elements.

A fastening component 100 of the invention is shown schematically with reference to FIG. 1. A base 110 has two surfaces: a fastening surface 112 and a non-fastening surface 114. The base structure may be woven or not woven, such as an amorphous mat or a molded solid or any other suitable structure. The material from which the base is made may be polymeric plastic, natural fibers or any other suitable material. The invention is not limited to the mechanical form of the base, and any known mechanical form of base for separable touch-type fasteners is believed to be consistent with the invention. Often, the base is a plastic base and it is attached to a separate substrate of a different material. If the base is a woven structure, the base portion may be referred to as a "ground fabric."

In a preferred embodiment, the base presents on its fastening surface 112, a plurality of hook-type elements 116. The hook-type elements may be shaped as hooks, or mushrooms or two tined anchors, or any other mechanical form of hook-type element used for separable touch-type fasteners, which engage loop-type elements, as is known in the art. Such elements are referred to herein as "hook-type", or "hook-like" or "hook" elements, whether or not they are in the shape of hooks. Any known mechanical form, and any as yet unknown mechanical form of hook elements is believed to be consistent with the invention. (The invention may also be incorporated into the loop carrying portion of a fastener pair.)

Figure 9A:
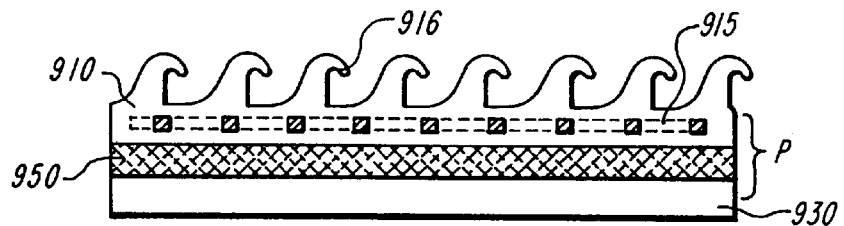
FIG. 9A shows schematically a fastening component of the invention having a unitary molded base carrying hooks on one surface thereof, laminated with a separate substrate, with a layer of porous metal embedded within the base layer, relatively near to the fastening surface.
Figure 9C:
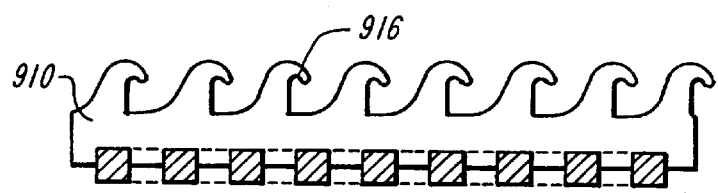
FIG. 9C shows schematically a fastening component of the invention having a unitary molded base carrying hooks on one surface thereof, and with a layer of porous metal partially embedded into the non-fastening surface of the base layer.

According to one embodiment of the present invention, the base layer includes at least one layer 115 of a magnetically attractive porous metal containing web. According to another embodiment, described below, the porous metal containing web need not be magnetic, but does need to be electrically conductive. The metal web may be located anywhere between the fastening surface 112 and the non-fastening surface 114 of the base 110. It may also be partially embedded in the non-fastening surface 114 (as shown in FIG. 9C).

By "porous" it is meant that the metal containing layer 115 has a continuous phase with openings therethrough of a sufficient size to permit the material from which the base is made to pass through the metal containing layer under the conditions of fabrication of the fastening component. The metal containing layer may be any form, including, but not limited to metal that is woven, non-woven, perforated, expanded, or simply parallel warp threads. In such form, any magnetically attractive metal or metal compound is suitable. Such metals include iron, iron oxide (in various forms, such as magnetite, hematite, iron (II) oxide, iron (III) oxide, iron (III) stearate, various organo-iron compounds and rare earth metals and their compounds.

Further, the metal containing layer may have powdered or granular metal distributed throughout a non-metal sheet that is itself porous. For instance, metal powder can be incorporated into a plastic, which is formed into a perforated polymeric sheet, or which is woven into a plastic, polymeric screen. Suitable magnetic attractants for the granular or powdered constituent in a non-metal sheet include: all ferro-magnetic materials, such as iron (powder), iron oxide (various forms, including magnetite, hematite, iron(II) oxide, iron (III) oxide), iron (III) stearate (and various organo-iron compounds) and rare earth metals and their compounds. Rather than plastic, the main constituent of such a composite metal containing material may be paper, epoxy resin, fiber, etc.

The result is that the porous layer is at least partially, and frequently fully, embedded within the base layer.

In the following discussion, the phrase "metal containing" will be used to mean either of the embodiments discussed above: 1) a metal article; or 2) an article that has a non-metal portion which includes metal constituents, such as granules or powder or liquid.

Figure 2:
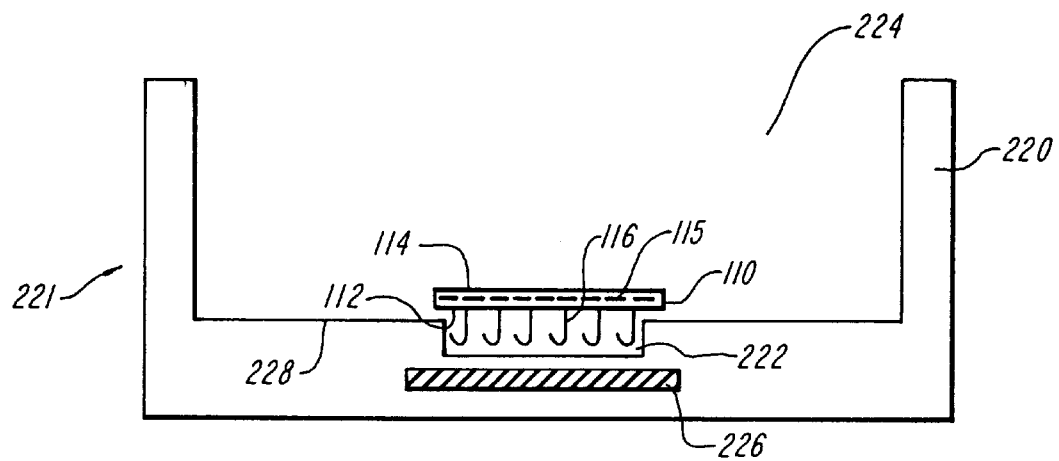
FIG. 2 is a cross-sectional side view of a mold for use with the invention, having a cavity for insertion of the fastening component and a magnet within the mold walls, also showing an embodiment of a fastening component of the invention in place in the mold for molding.

The magnetically attractive embodiment of the fastening component of the invention will be discussed first, followed by the electrically conductive embodiment. As shown in FIG. 2, the magnetically attractive embodiment of the invention includes a fastening component 100 that is used in a mold 221, having a main mold wall 220 surrounding a main cavity 224. A fastening element-receiving mold valley 222 is in the bottom wall 228 of the mold. Embedded in the bottom wall 228 is a magnet 226, such as is known in the art.

The fastening component 100 is inserted into the mold, adjacent the fastening element-receiving valley 222, with the hooks 116 facing into the valley 222. The magnet 226 attracts the fastening component 100 toward the bottom mold wall 228, due to the magnetically attractive porous metal containing layer 115 contained in the base 110 of the fastening component 100. The magnetic attraction secures the fastening component to the mold wall, positioning it at the appropriate location and inhibiting the incursion of the molding material among the fastening elements.

In addition to the magnetic attractant, other techniques can be used to position the fastening component and to prevent the fouling of the fastening elements with the molding material. Any such structures known to the art, and any such structures yet to be developed, are believed to be consistent with the invention. For instance, a film strip can completely cover the fastening elements, such as is shown in U.S. Pat. No. 4,693,921, issued in 1987 to Billarant, entitled FASTENING TAPE DESIGNED TO BE ATTACHED TO A MOLDED ARTICLE DURING MOLDING, AND ITS ATTACHING METHOD. Rather than covering the entire surface of the fastening elements, strips of film can border the fastening element region, forming gaskets to prevent the incursion of film. Such film regions are shown in U.S. Pat. No. 4,726,975, issued in 1988 to Hatch, entitled METHOD AND APPARATUS FOR ADAPTING SEPARABLE FASTENERS FOR ATTACHMENT TO OTHER OBJECTS.

Co-assigned, U.S. Ser. No. 08/568,132, filed of even date herewith, entitled SEPARABLE FASTENER HAVING DIE-CUT PROTECTIVE COVER WITH PULL TAB AND METHOD OF MAKING SAME, by the same inventors hereof discloses a fastening component for use with molded articles that has a base with fastening elements upstanding therefrom and a relatively thin, protective cover attached thereto. The cover is attached to the base by thermal processes. For instance, the cover and the base can be cut into a shape by a die that substantially simultaneously cuts the shape from a larger web of both and joins the two pieces together by heat induced processes, such as welding. The shaped piece may be rectilinear or curved or any complex shape. The cover may include a pull tab at one or both ends. The pull tab is formed from the cover material itself, a piece of which is folded over on itself and cut and sealed to adjacent layers at the same time that the main shape is being cut and sealed. The disclosure of the foregoing U.S. Ser. No. 08/568,132 is hereby incorporated herein fully by reference.

Also possible is to use an elastomeric covering that intimately (either completely, or partially) surrounds the fastening elements, such as is described in U.S. Pat. No. 5,286,431 (for fully surrounding), issued to Banfield et al. in 1994, entitled MOLDED PRODUCT HAVING INSERT MOLD-IN FASTENER or, (for partially surrounding) as shown in PCT application No. PCT/US94/07473 for HOOK AND LOOP TYPE INSERT USED IN MOLDING PROCESS, published Jan. 19, 1995, corresponding to U.S. patent application Ser. No. 08/087,917, filed on Jul. 6, 1993, entitled DIE CUT MOLD-IN. All of the foregoing patents and applications are hereby incorporated herein by reference.

Another possibility is to use a fastening component, for instance having hook-type fastening elements, that has a pattern of hooks with a main central region, circumscribed by a bald region that is substantially free of hooks, which is itself circumscribed by a perimeter region of hooks. The fastening element is used with a mold having a central valley, surrounded by a perimeter land, which is in turn typically surrounded by a perimeter valley. The perimeter valley mates with the perimeter region of hooks; the land mates with the bald region; and the central mold valley mates with the central main region of hooks. The perimeter region of hooks may be partially fouled by the incursion of foam material, however, the main, central region of hooks is not fouled, being protected by the "sacrificial" perimeter hooks. Such an arrangement is described in co-pending, co-assigned U.S. Ser. No. 391,695, filed on Feb. 17, 1995, in the names of Brian J. Routhier, Martin I. Jacobs and George A. Provost, entitled SEPARABLE FASTENER HAVING A BALD PERIMETER RIB BOUNDED BY FASTENING ELEMENTS, which is incorporated fully herein by reference.

The molding process is shown schematically in FIGS. 3, 4, 5 and 6, for incorporating an embodiment of the fastener of the invention that is a back-to-back hook and anchor fastener into a molded product. The fastener component 300 is inserted into the main cavity 324 of the mold 321, with its fastening elements 316 facing the fastening element receiving valley 322 and its anchoring elements 334 facing the central region of the main mold cavity 324. The magnet 326 attracts the fastening component 300 toward the magnet 326 due to the magnetically attractive porous layer, thereby enhancing the sealing of the fastening component to the mold wall 328. This positions the fastener component and helps to prevent fouling of the hook components 316 during the molding process.

Figure 4:
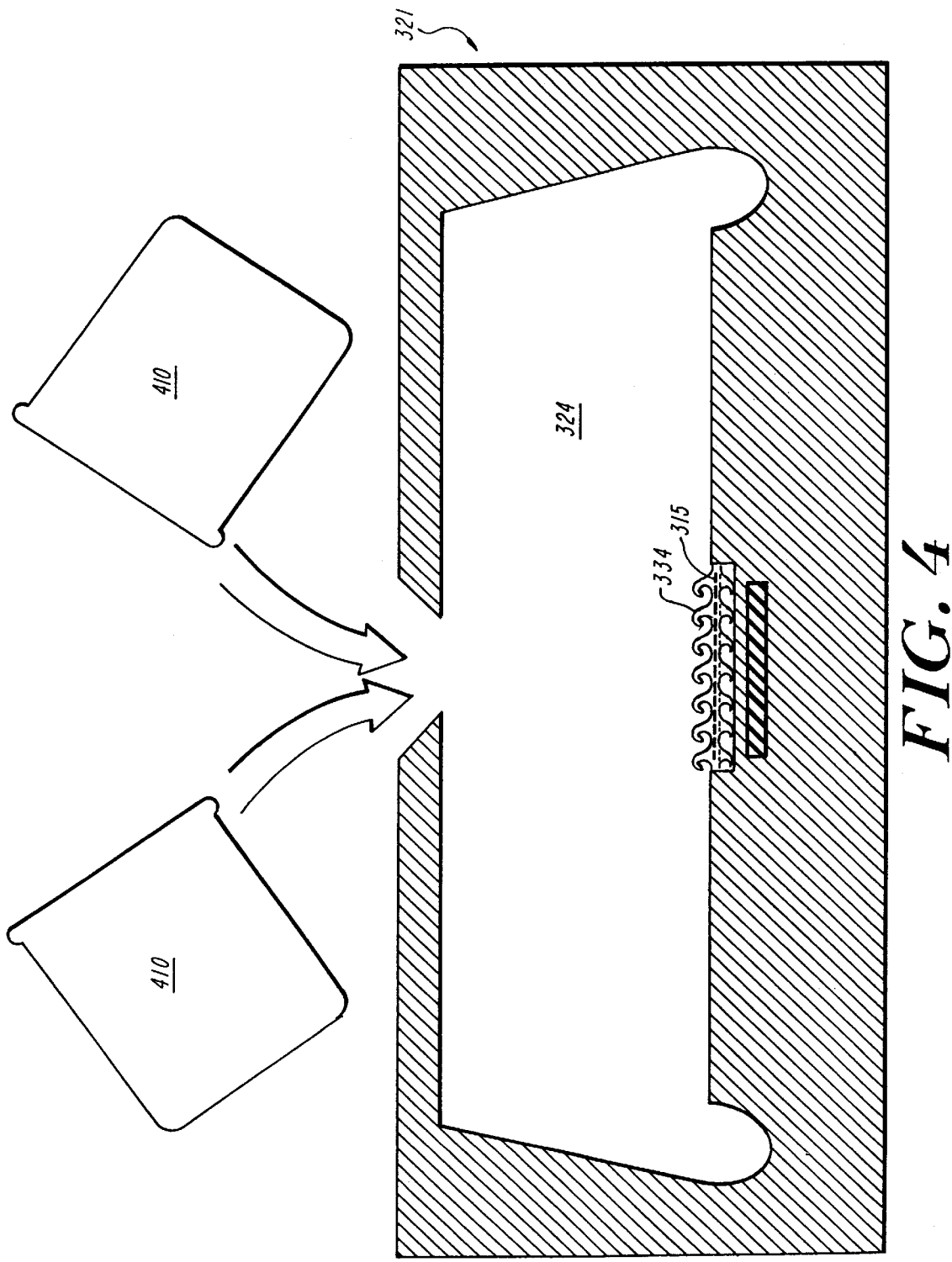
FIG. 4 shows, schematically, the mold of FIG. 3, with molding material being poured into the mold.

The next step in the molding process is shown schematically in FIG. 4, where the molding material 410 is introduced into the mold. The molding material may constitute a single component, or there may be multiple components that are mixed as they are introduced into the mold, or before.

Figure 5:
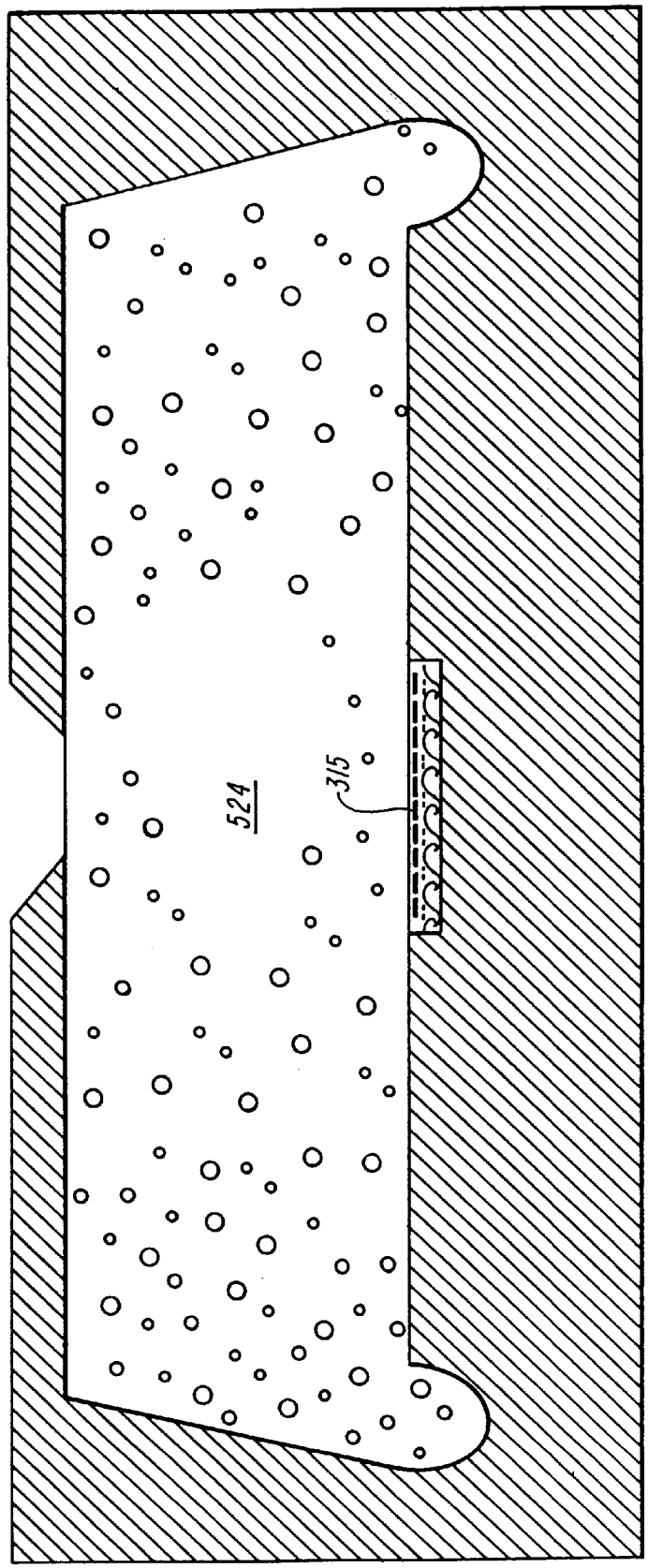
FIG. 5 shows, schematically, the molding material curing in the mold shown in FIG. 4.
Figure 6:
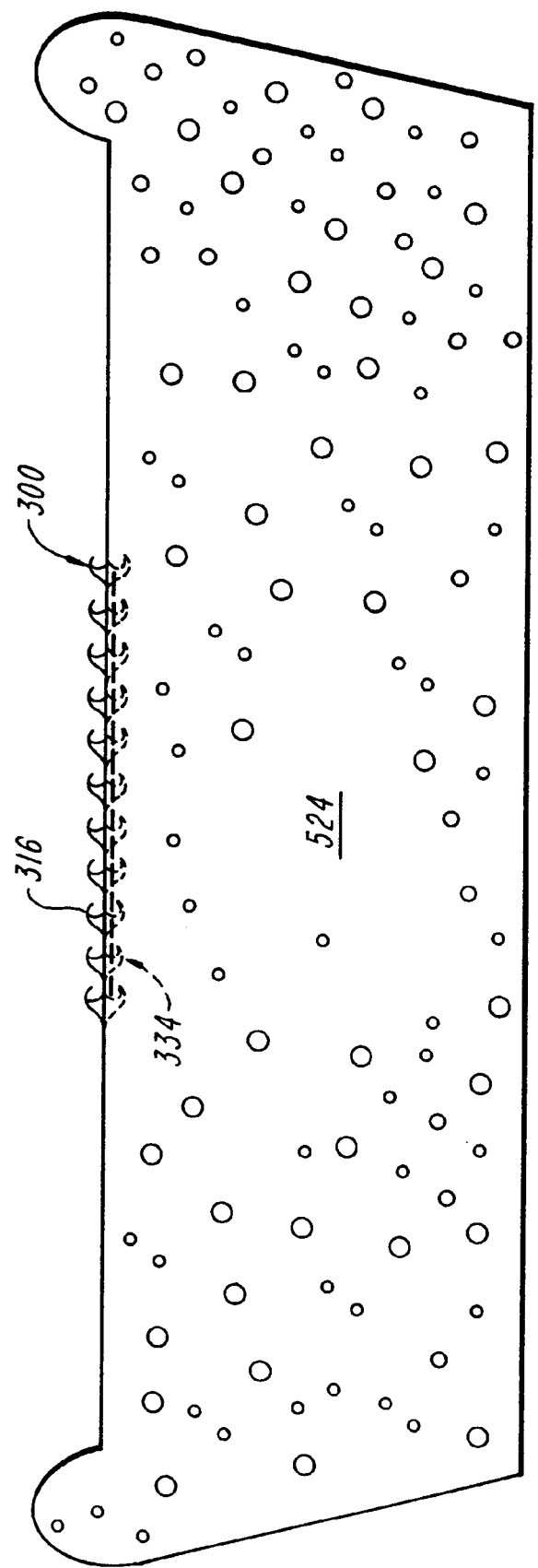
FIG. 6 shows, schematically, a molded product including a fastening component of the invention.

The article being formed 524 is shown schematically in FIG. 5. The anchor elements 334 are surrounded by the molding material, thereby embedding the fastening component into the molded article. It is not necessary that anchoring elements be used, and there are many ways known to the art that do not use them. For instance, rather than the anchors, a backing layer of fiber loops can be used, which are infiltrated by the foaming material thereby anchoring the fastener to the foam body. FIG. 5 is intended to show both anchored and unanchored embodiments. A molded article 524 incorporating the magnetically attractive fastening component 300 due to the porous metal containing layer 315 with exposed hook components 316 is shown schematically in FIG. 6. The optional anchoring elements 334 are shown in phantom, embedded in the molded material. A typical type of molded article is a foam seat cushion, such as for an automobile or airplane. Rather than foam, other types of molded materials are also suitable.

In a typical embodiment of the invention, the hook elements 116 and the base 110 are molded unitarily from the same precursor element as one mechanical element, and are thus composed of the same material. Suitable such materials include: polymeric plastics such as: polypropylene, polyethylene, polyamide, polyester, polystyrene, polyvinyl chloride, acetal, acrylic, polycarbonate, polyphenylene oxide, polyurethane, polysulfone, and thermoplastic elastomers.

Figure 7:
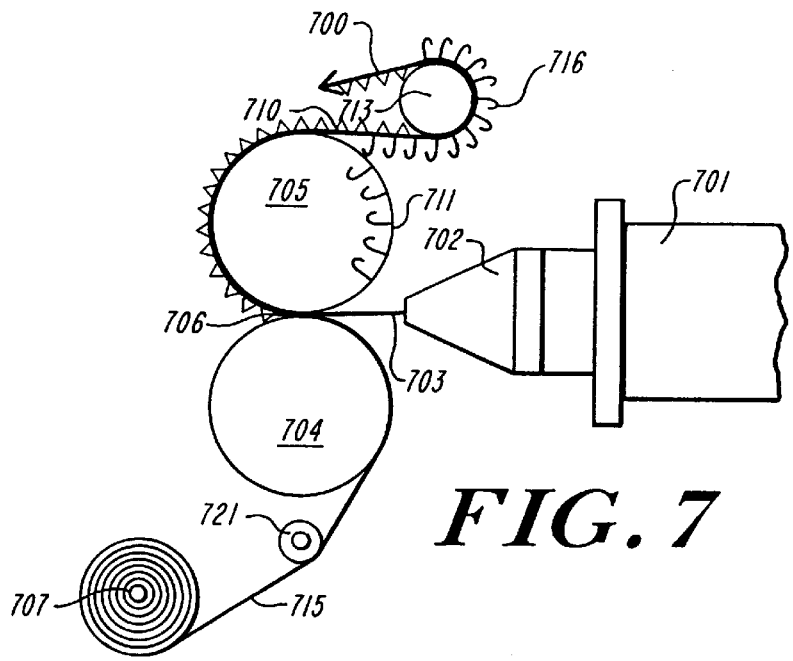
FIG. 7 shows schematically an apparatus and process for manufacturing an embodiment of the fastener component of the invention, having a unitary molded base carrying hooks on one surface thereof and a porous metal layer embedded in the base.

An apparatus for molding a fastening component having unitarily molded fastening elements and base is shown schematically in FIG. 7. This apparatus is a slightly modified version of the type shown generally in U.S. Pat. No.: 4,794,028, entitled METHOD FOR CONTINUOUSLY PRODUCING A MULTI-HOOK FASTENER MEMBER AND PRODUCT OF THE METHOD, issued in 1988 to Fischer; U.S. Pat. No. 4,872,243, entitled MULTI-HOOK FASTENER MEMBER, issued in 1989 also to Fischer; and U.S. Pat. No. 4,775,310, entitled APPARATUS FOR MAKING A SEPARABLE FASTENER issued in 1988 also to Fischer. All three patents are incorporated herein by reference. An extruder barrel 701 melts and forces molten plastic 703 through a die 702, into the nip 706 between a base roller 704 and a cavity roller 705, that contains cavities 711 to form the hooks 716 of a strip fastener 700, which extend from a web-like base 710 composed of the same material as is the hooks 716. The strip fastener material formed at the nip 706 travels around the periphery of the cavity roller 705 and around the stripping roller 713, which assists in pulling the formed hook sheet from engagement with the cavity roll 705. The strip is then passed to a wind-up roll, not shown.

A roll 707 of a porous metal containing web 715 is provided, such that the leading edge of the web is guided into the nip 706 on the side of the molten plastic 703 facing the base roller 704. The base roller 704 is typically flat faced (although it may be embossed, as described below, to impart a three dimensional pattern to the non-fastening face of the fastener). The force of the rolls, in addition to forcing the molten plastic into the cavities to form the fastening elements, also forces molten material into the open porosities in the porous metal layer 715, resulting in the porous metal containing layer being embedded to some extent in the body of the formed plastic base of the fastening component. The degree of embedding can be controlled, from complete, as shown in FIG. 9A, to partial, as shown in FIG. 9C. As used below, a deeper embedding is closer to the fastening surface than to the non-fastening surface. The degree of embedding is controlled by varying the tension in the porous web (more tension results in shallower embedding), its thickness (thicker porous layer results in deeper embedding), over drive among the rolls 704 and 705 and 716 (more over drive implies deeper embedding), the nip pressure, extruder flow, elasticity of the molten polymer and polymer temperatures. A tensioning roller 721 or some other suitable apparatus as known in the art may be used to feed the porous metal containing web 715 to the nip 706.

Once embedded into the formed plastic part, the porous metal containing layer continues around the cavity roller 705 as part of the part. Its presence is indicated schematically by the triangles around the roll. It should be understood that the triangles shown are schematic only. There is no triangular structure included in the fastener.

In general, the porous metal containing layer is more flexible than would be a solid metal layer such as is known in the prior art. It is also less prone to curling, and is lighter than the solid layer, both of which make it easier to fabricate. Care must be taken not to inadvertently stretch the porous metal layer, which is more prone to such deformation than would be a solid layer. (Controlled prestretching of an expanded metal before it is annealed may be conducted in some cases.) Use of the porous layer eliminates problems of adhering the base layer to an anchor layer or to the foam.

Figure 3:
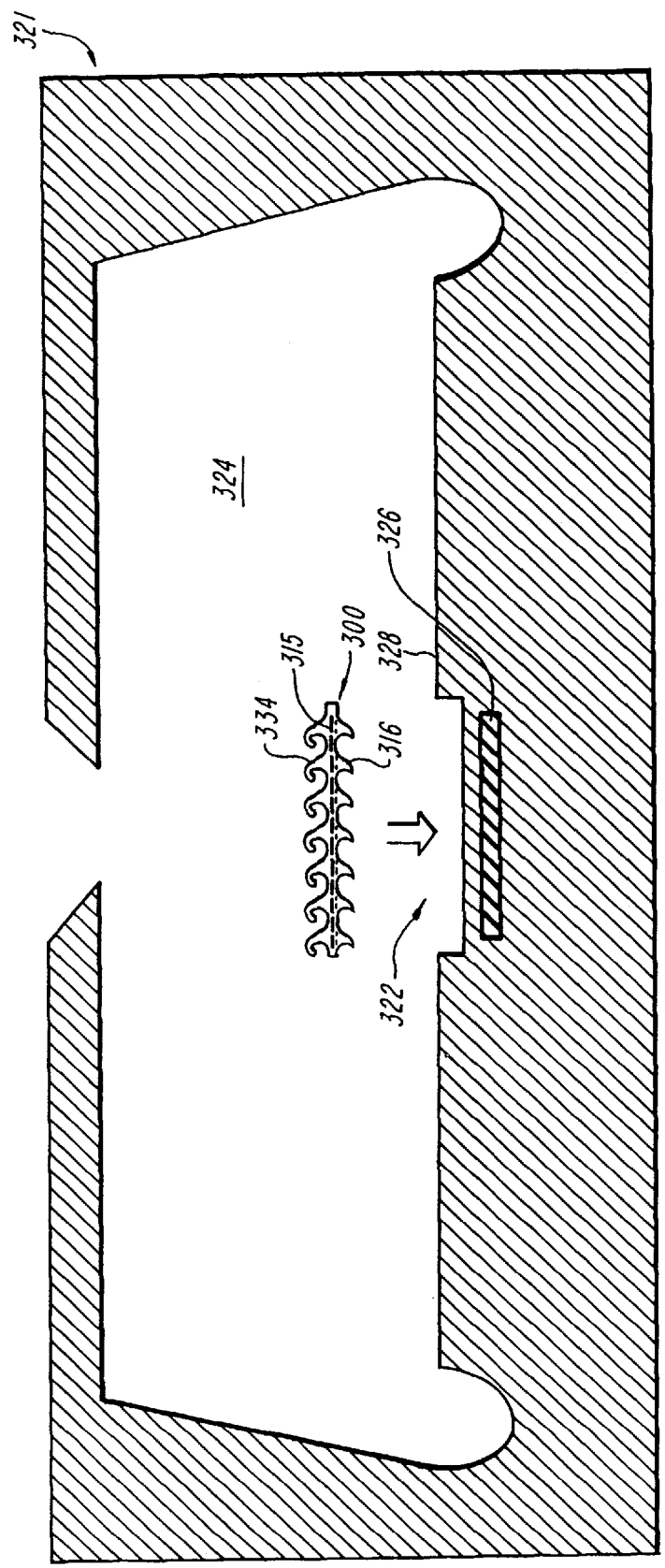
FIG. 3 is a cross-sectional view similar to that shown in FIG. 2, where the mold-in product has an embedded, porous metal layer and hooks and anchors back-to-back.

Choice of the type of porous metal and its configuration will depend on many factors. The following general principals apply. The purpose of the porous metal containing layer 315 in the magnetic embodiment of the invention, as shown in FIGS. 3, 4 and 5, is to prevent the fastening component 334 from moving away from the mold trough 322, at the mold wall 328. If the fastening component 334 were to move away, it would be principally under the influence of its buoyancy in the foaming material 524. Thus, the force of magnetic attraction between the magnet 326 and the porous metal layer 315 must be greater than the force of buoyancy applied to the fastening component. The magnetic force of attraction must also counteract forces due to mold movement and vibration and the momentum of the in-flowing urethane constituents when they are injected or poured into the mold. It is not possible to specify what these forces will be, since they depend on many different factors. The factors to consider are as follows.

The buoyancy of the component depends on its density relative to the density of the foaming liquid which changes over time, due to the chemical reactions that take place. Raw urethane, for instance, has a specific gravity that is typically in the range of from 0.8 to 2. Cured, solid urethane has a density that is dramatically less and varies greatly, typically between 5 and 50% of the density of the raw urethane. The force of magnetic attraction depends on the strength of the magnetic field of the magnets 326, which depends on the size of the magnets and their composition. This factor is highly controllable by the mold designer. Also contributing to the force of the magnetic attraction is the mass of magnetically attractive metal in the porous metal containing layer 315, and its distance from the magnet 326 that is in the mold. In general, the force of magnetic attraction is linearly proportional to the mass of the magnetically attractive metal. However, it is inversely proportional to the cube of the distance between the porous metal containing layer 315 and the magnet 326. Thus, small changes in the location of the metal containing layer cause relatively large changes in the force of magnetic attraction, while changes in the mass of metal do not produce such significant changes in the magnetic attraction force.

The foregoing considerations should enable a designer to determine how much metal should be included in the porous metal containing layer, and where to locate it, to enable magnetic attraction to the mold. Another consideration to be made is the degree to which the porosity facilitates attachment of the base layer of the hook component 910 (as shown in FIG. 9A) to the material of any substrate 930. In general, the more porous the metal containing layer, the better will be the adherence between the two layers.

Thus, the two concerns of facilitating a relatively high force of magnetic attraction and a high degree of adherence between the base layer 910 of the hook component and the substrate layer 930 compete with each other. Thus, the designer must balance the concerns.

A preferred form for the porous metal containing layer is expanded metal, such as is sold by Exmet Corporation of Naugatuck Conn., 06770. Expanded metal is sheet metal that is slit and stretched. The slitting and stretching can be done simultaneously to determine the form and number of openings. Strand dimensions (width and thickness), overall thickness of the piece and weight per square unit of area are controllable variables.

Figure 13:
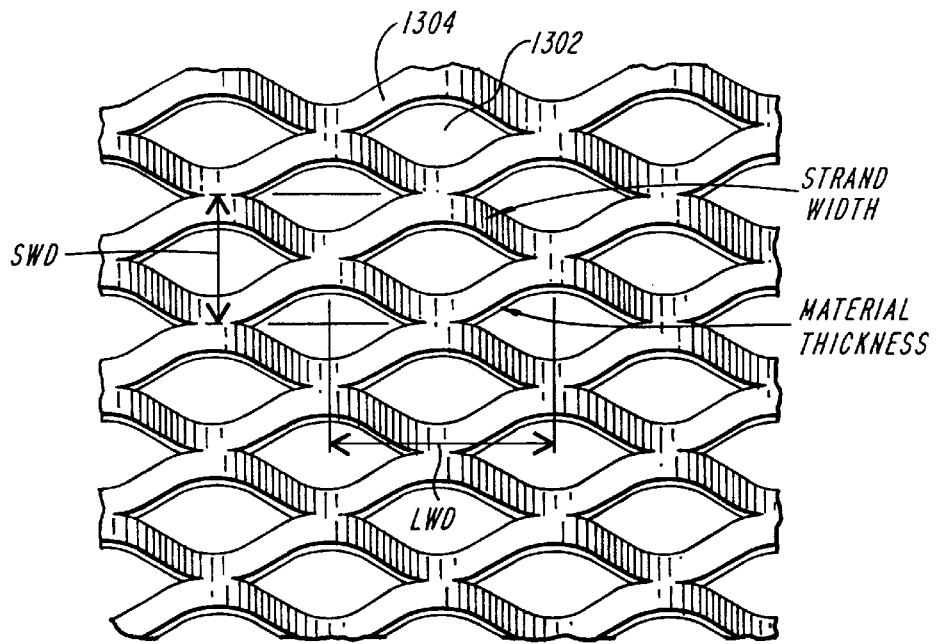
FIG. 13 shows a schematic perspective view of a piece of expanded metal, which can be used for the porous metal layer.

As shown schematically in FIG. 13, expanded metals typically have diamond shaped openings 1302 surrounded by metal strands 1304. The dimension along the long way of the diamond ("LWD") is measured from the center of one joint to the center of the next joint. This dimension is governed by the die used to slit the metal. It is typical for this dimension to be aligned parallel to the width of a roll of the material. Perpendicular to the long way of the diamond dimension is the short way of the diamond ("SWD"), also measured from the center of one joint across the diamond to the center of the next joint. This dimension varies depending on the degree of expansion. The thickness of the original material governs the strand thickness. This dimension twists somewhat, essentially to become perpendicular to the original plane of the material, however, it may be flattened if desired. The strand width is based on the distance between the slits and is generally greater than the metal thickness. The strand width contributes to the overall thickness of the material, (due to twisting), which is generally less than twice the strand width. The degree of expansion also contributes to the overall thickness.

The expanding process causes work hardening in most metals. This is typically not desirable for the application described herein because a common use of this product (described below) requires that shapes be die-stamped from the product. Work hardened metal is harder to die-cut than is non-hardened material. Thus, an annealing process should be applied to the metal before use. Such annealing is available from the metal supplier. Expanded metal is available in wide sheets, for instance as large as 60 inches (152.4 cm).

A preferred form for the expanded metal for some applications is pre-stretched in the direction parallel to the SWD (which is the machine direction, as discussed below) then flattened and then annealed. This facilitates guiding the material and also permits greater tension to be applied to it during assembly, as described below. Prestretching and then annealing the metal reduces its elasticity, which makes it easier to apply greater tension to it during production of the fastener.

The foregoing discussion has not discussed a separate backing substrate. It is also possible, as is well known, for the hook elements to be unitarily molded with a base and for a web-like substrate to be manufactured from separate mechanical precursor elements. The substrate and hook elements with base are subsequently or simultaneously joined. For instance, the hook elements with base and the substrate can be co-extruded according to any known method; such as by a cross-head die or by calendering two separate extrusion streams together.

Figure 8:
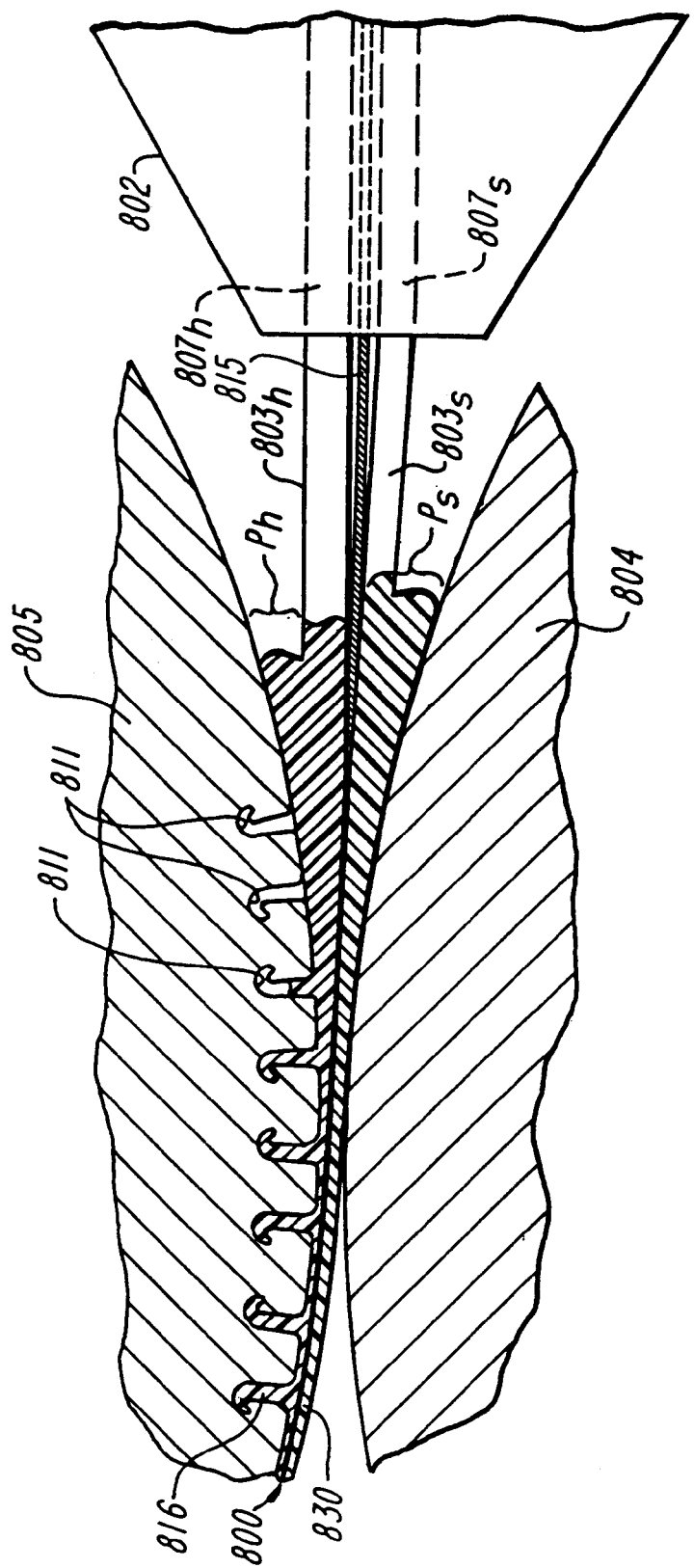
FIG. 8 shows schematically an apparatus and process for manufacturing an embodiment of the fastener component of the invention, having a substrate and hooks which are co-extruded and then laminated together with a porous metal layer embedded at least partially within the base layer.

An apparatus for molding a fastening component having coextruded fastening elements with a base and a porous metal layer embedded in the base layer and a substrate connected thereto is shown schematically in FIG. 8. This apparatus is similar to that shown above with reference to FIG. 7, but uses a cross-head die. Two streams of molten plastic 803$h$ (for hooks and base) and 803$s$ (for substrate) are forced through a cross-head coextrusion die head 802, with two different die orifices 807$h$ and 807$s$. The two streams of molten plastic are forced into the nip 806 between a base roller 804 and a cavity roller 805, that contains cavities 811 to form the hooks 816 of a strip fastener 800. A porous metal containing web layer is fed through the cross head die and into the nip between the two streams 803$h$ and 803$s$ of plastic, in much the same way that plastic coated wire is made. A pool of hot hook material $P_h$ forms upstream of the nip, as well as a pool of hot second substrate material $P_s$. At the nip, the hook material is forced into the cavities 811 in the hook roller 805 and also through the openings in the porous metal containing layer toward the substrate stream. Thus, the porous metal containing layer becomes at least partially embedded in the base layer. Simultaneously, the substrate material is flattened and spread into a web shape, along with a quantity of the hook material that has passed through the porous layer (which forms a base unitarily with the hooks being formed). The pressure in the nip joins the hook and base material, on the one hand, with the substrate material, on the other hand such that the hooks 816 and the substrate 830 are formed, and joined to become the fastener component 800 with the porous metal containing web layer embedded within. This coextruded component travels around the hook roller 805, and is stripped therefrom in the same manner as is a simple extruded unitary hook and base component, shown in FIG. 7. The strip is then passed to a wind-up roll, not shown. In a typical implementation, the metal containing layer is not visible at all outside of the body of the base layer.

Rather than a single sided hook component, as shown in FIG. 8, a back-to-back hook and anchor fastening component can be coextruded as shown in FIG. 8, with the material for forming the hook shaped anchors being in place of the substrate material. In such a case, the base roller 804 includes anchor shaped cavities around its periphery. An apparatus for making such a structure is shown in U.S. patent application Ser. No. 381,632, filed on Jan. 31, 1995, entitled BACK-TO-BACK HOOK FASTENER, which is a divisional application of U.S. patent application Ser. No. 92,312, filed on Jul. 14, 1993, and in a corresponding published PCT application, PCT/US94/07556, filed on Jul. 6, 1994 and published on Jan. 19, 1995 all of which are assigned to the assignee hereof, and all of which are incorporated herein by reference.

An article that could have been made with the equipment shown in FIG. 8 is shown schematically in FIGS. 9A, B and C. The hooks 916 are composed of a first material. A base 910 is unitary with the hooks 916, having been extruded therewith. The substrate 930 is composed of the same material, or a second, different material. The joining region, (indicated in cross-hatch), which may take many different physical forms, exhibits a transition from the hook material to the substrate material. The use of the porous metal containing layer permits effective joining between the hook material and the substrate material across the entire width of the component, without the need for adhesives, or the risk of delamination that arises with a solid metal shim. The porous metal containing layer can be located anywhere within the region P.

The structure of the substrate may be a woven or a non woven fabric.

It has already been discussed to use a unitary extrusion from which are molded hooks and a unitary base, as well as a coextrusion, which joins a base having hooks to a substrate. Other methods may be used for joining a hook component to a substrate. Another method is to embed a porous metal containing layer into a unitary hook and base, as the hook carrying web is being extruded and formed and to simultaneously laminated an already formed substrate layer to the hook and base layer. A precursor of this technique (without the porous metal layer) is described generally in U.S. Pat. No. 5,260,015, issued Nov. 9, 1993, entitled METHOD FOR MAKING A LAMINATED HOOK FASTENER, in the name of William J. Kennedy et al., which is incorporated herein by reference. This method may be referred to as the "one-wrap"™ method and parts made thereby are referred to as one-wrap™ fasteners. The apparatus for implementing the method is shown schematically in FIG. 10. As with the embodiment shown in FIG. 7, an extruder barrel 1001 melts and forces molten plastic 1003 through a die 1002, into the nip 1006 between a base roller 1004 and a cavity roller 1005, that contains cavities 1011 to form the hooks 1016 of a strip fastener 1000, which extend from a web-like base 1010 composed of the same material as is the hooks 1016. The strip fastener material formed at the nip 1006 travels around the periphery of the cavity roller 1005 and around the stripping roller 1013, which assists in pulling the formed hook sheet from engagement with the cavity roll 1005. The strip is then passed to a wind-up roll, not shown.

A roll 1017 of pre-formed porous metal containing web material 1015 is inserted into the nip 1006 to become embedded into the base 1010. The porous metal containing web material bonds intimately with the unitary base 1010 composed of hook material to become an integral part of the base. The metal containing layer 1015 may become completely submerged and embedded within the base layer 1010, or it may be partially embedded with "islands" or bumps of the base material accessible or protruding through the openings in the metal layer 1015. Other rollers and tensioning equipment are used to maintain the proper tension and flatness on the metal sheet 1015.

At the nip 1006, the metal web 1015 is joined to the hook material, as indicated by the small triangles downstream of the nip. (The triangles are not indicative of any triangular structure. They are simply used to identify what is typically a flat sheet-like structure.)

A pre-formed roll 1030 of substrate sheet material 1032 is also inserted into the nip 1006. The substrate material 1032 bonds intimately with the unitary base 1010 composed of hook material to become an integral part of the structure of the strip fastener. If the metal containing layer 1015 is fully embedded or submerged in the base layer then the sheet material 1032 simply is laminated to the non-fastening face of the base layer. If the porous metal layer is only partially embedded into the base layer, then the sheet material 1032 and the base layer meet through the openings of the porous metal layer, with one or the other or both passing beyond the mid-plane of the metal layer. At the nip 1006, the substrate sheet material 1032 is laminated to the hook material, as indicated by the small half-circles downstream of the nip. (The half-circles are not indicative of any circular structure. They are simply used to identify what is typically a flat sheet-like structure.)

A set of pins 1034 may help to carry the sheet material in a flat unwrinkled state. Other rollers and tensioning equipment 1019 are used to maintain the proper tension and flatness on the sheet material that will form the laminated substrate.

Figure 10:
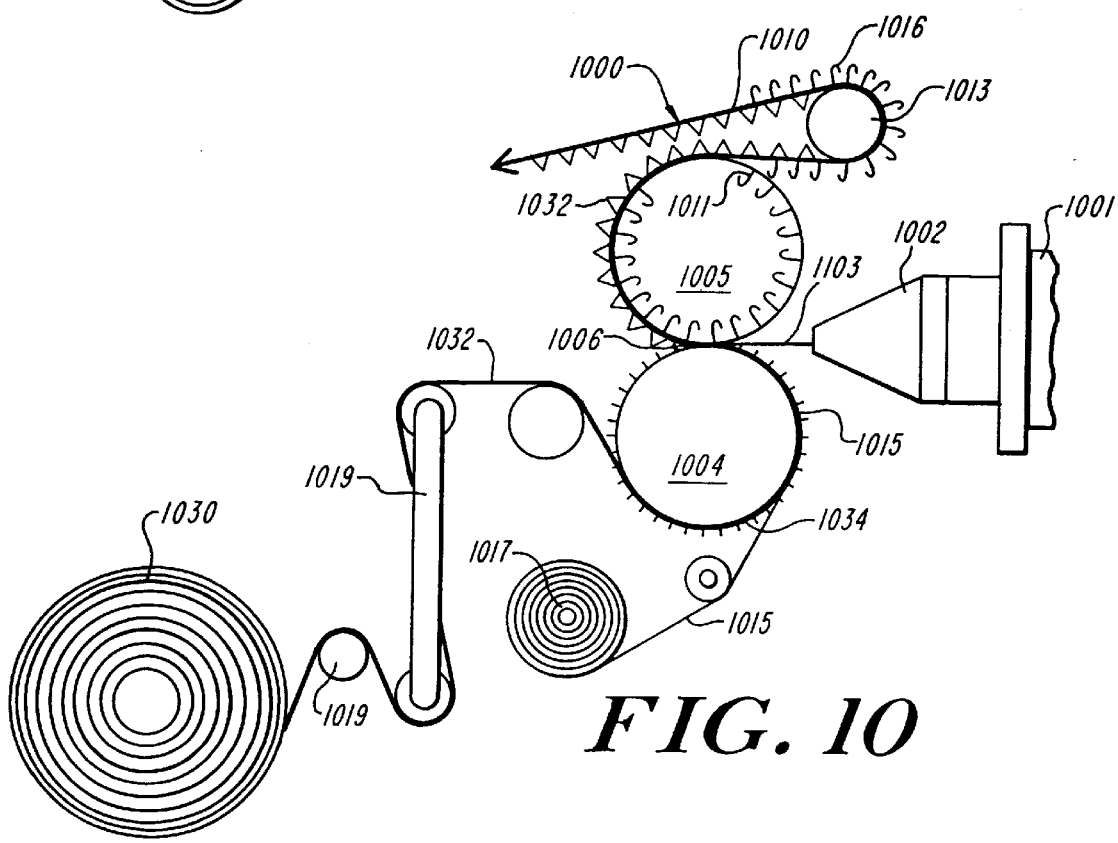
FIG. 10 shows schematically an apparatus and process for manufacturing an embodiment of the fastener component of the invention, having a unitary molded base carrying hooks on one surface thereof, which is further laminated with a substrate of a different material.
Figure 9B:
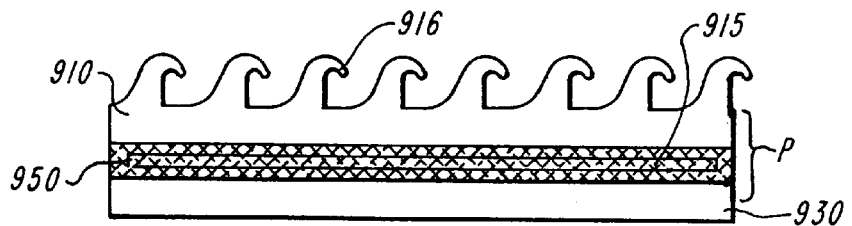
FIG. 9B shows schematically a fastening component of the invention having a unitary molded base carrying hooks on one surface thereof, laminated with a separate substrate, with a layer of porous metal embedded within the base layer, substantially within a region where the base layer and the substrate are intermixed to some degree.

A fastener strip formed by the apparatus shown in FIG. 10 may also be represented schematically by FIGS. 9A, B, and D. Again, the hooks 916 and a unitary base 910 are laminated to the substrate sheet material 930. A transition region 950 is composed of both the substrate material and the hook material. The porous metal containing layer may be located anywhere within the body of the composite structure, within the region P. If the substrate material is not a type into which the metal containing layer can be embedded, for instance, if it is a fabric loop substrate, then, of course, the porous metal containing layer may only be located as shown in FIGS. 9A or 9B, but not 9D.

There are many candidates for the sheet-like substrate. The structure of the substrate may be woven or non-woven. It may constitute an open or a tight weave. It may be paper, with or without an adhesive backing, or may constitute a thin sheet of foam. It can also constitute the loop component of a normal hook and loop fastener pair. The material from which the substrate is made may be a thermoplastic, or a natural fiber, or a non-thermoplastic polymer. If the substrate is of a thermoplastic material, it would typically have a higher melt temperature than the hook material, so that the substrate does not melt during the hook forming process and laminating process shown in FIG. 10. Any one of the foregoing may be useful to enhance the anchoring of the hook component into the article being molded. The type of sheet material substrate to which the hooks are laminated is not material to the invention.

The invention does not depend on the method by which the hook elements or the substrate are manufactured. All that is required is that a magnetically attractive porous metal layer be at least partially embedded into the base or substrate layers such that it can be attracted by the magnet in the mold.

Rather than the "one-wrap"™ fastener laminating method shown in FIG. 10, an off-line method can be used after the hook and base material is formed alone without the substrate, such as shown in FIG. 7. Afterward, three rolled webs, one of hook carrying base material, one of the porous metal containing layer, and the other of the substrate, can be laminated together, embedding the porous metal containing layer within one of the other two. At the same time, a fourth web of a thin protective film can be applied to cover the hooks, to protect them against intrusion of molding material. The film can be secured to the hook carrying base, and/or substrate, depending on their relative widths, ultrasonically, or by heat and pressure, or adhesive.

EXAMPLES

In a first example, molded hooks, of the type known as Ultra 8® brand hooks sold by Velcro USA Inc. of Manchester, N.H., were molded using the unitary continuous forming method, such as shown in FIG. 7, also described in the above cited U.S. Pat. Nos. 4,794,028, 4,872,243 and 4,775,310 to Fischer. The material provided to the extruder was polyamide, such as sold under the trade name Zytel™ 4209 from Du Pont de Nemours and Co. The processing temperatures ranged from 530° F. (267° C.) in the feed section of the extruder to 595° F. (313° C.) at the die. The temperature of the base roll was 46° F. (8° C.), the cavity roll 66° F. (19° C.) and the stripping roll was 45° F. (7° C.). A 12⅝ in. (32 cm.) wide porous metal web of expanded metal available from Exmet Corp. of Naugatuck, Conn., under trade designation 5Fe10-1/0 was fed into the nip and embedded in the forming base layer. This material is formed from a sheet of mild steel five mils thick (0.005 in. (0.12 mm.)) having a strand width of ten mils (0.01 in. (0.24 mm.)), expanded in a pattern with an LWD dimension of 0.280 in. (0.71 cm.) and an SWD dimension ranging between 0.100–0.150 in. (0.254–0.381 cm.). A substrate backing layer of fabric loops was added, as shown in FIG. 10, and was kept under 4 lb./lineal inch tension. The porous metal layer was maintained at no tension, although tension may be applied, and it may even be preferable to apply tension to the metal web. The pressure at the nip between the two rolls was 6,600 lb. The porous metal layer became fully embedded within the base of the hook layer.

The same processing parameters were used for two different webs of expanded metal, with similar results. A web available from Exmet Corp. under trade designation 5Fe15-1/0 was used. It differs from the 5Fe10-1/0 in that it has a strand width of fifteen mils (0.015 in. (0.36 mm.)) rather than ten mils (0.01 in. (0.24 mm.)).

In a third trial, a web available from Exmet Corp. under trade designation 5Fe20-1/0 was used. It differs from the 5Fe10-1/0 in that it has a strand width of twenty mils (0.02 in. (0.48 mm.)) rather than ten mils (0.01 in. (0.24 mm.)).

Figure 9D:
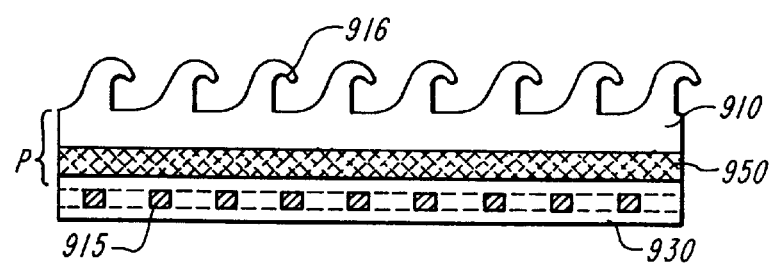
FIG. 9D shows schematically a fastening component of the invention having a unitary molded base carrying hooks on one surface thereof, laminated with a separate substrate, with a layer of porous metal embedded within the substrate, relatively spaced from the region where the base layer and the substrate are intermixed.

The foregoing discussion has generally assumed that the porous metal containing layer will be embedded within the base layer of the hook component. However, when both the hook component and the backing substrate are of a thermoplastic material, which join under the influence of heat and/or pressure, such as in the nip of the machine shown in FIG. 8, it is somewhat arbitrary to refer to either the fastening component base or the substrate, as being the locus of embedding of the porous metal containing layer, since a continuum results, being wholly fastening component base at one extreme and wholly substrate at the other. Further, the invention is also contemplated to include those embodiments where the porous metal containing layer is embedded wholly within the substrate backing layer, if it be of appropriate construction, which then joins with the base layer of the fastening component. This embodiment is shown explicitly in FIG. 9D. Thus, the porous metal containing layer can be located anywhere within the region indicated by the braces P in FIGS. 9A, 9B and 9D, where 9A shows the porous metal containing layer 915 embedded substantially within the base 910 of the hook portion; FIG. 9D shows it embedded substantially within the substrate portion 930; and FIG. 9B shows it fully embedded within the complex of the hook portion and the substrate, substantially straddling the region where the two are intermixed.

While the foregoing has focused on an expanded metal porous layer, other mechanical forms of porous metal containing layers are possible and within the contemplation of the invention. For instance, the metal layer may be wholly metal in the form of perforated, or stamped sheets, woven and non-woven screens, or non-woven mats. Parallel, non-woven strands of metal wire, such as warp threads only, may be used.

Rather than wholly metal, the metal containing layer may be a composite of metal and other substances, such as a thermoplastic matrix throughout which is distributed metal powder or granules. This composite layer must, however, itself be porous, with holes or openings through it. Suitable magnetic attractants for the granular or powdered constituent in a non-metal sheet include: all ferro-magnetic materials, such as iron (powder), iron oxide (various forms, including magnetite, hematite, iron(II) oxide, iron (III) oxide), iron(III) stearate (and various organo-iron compounds) and rare earth metals and their compounds. Rather than plastic, the main constituent of such a composite metal containing material may be paper, epoxy resin, fiber, etc.

All that is required is that the layer be sufficiently magnetically attractive to secure the component to the mold during molding and sufficiently porous to the material from which the base is formed during fabrication to allow the metal containing layer to be at least partially embedded into the base layer.

Figure 11:
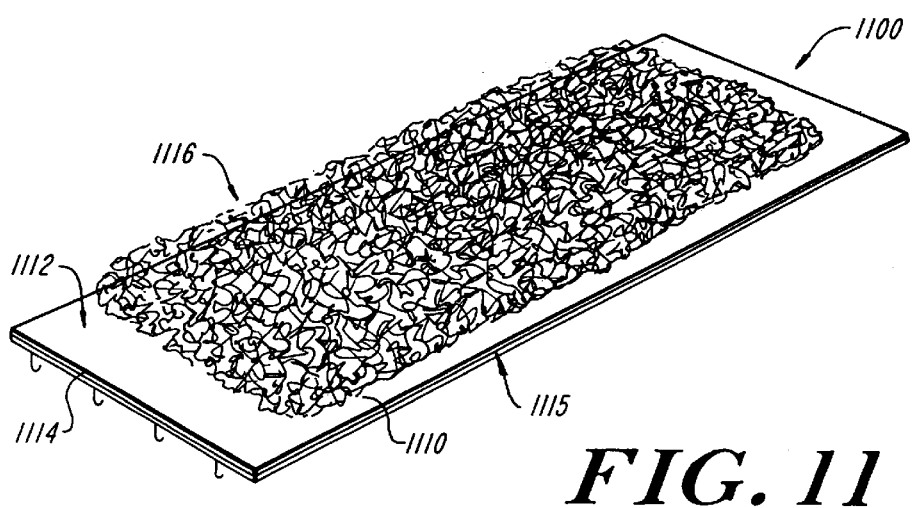
FIG. 11 shows schematically an embodiment of the invention, having a magnetically attractive loop carrying fastener component.
Figure 12A:
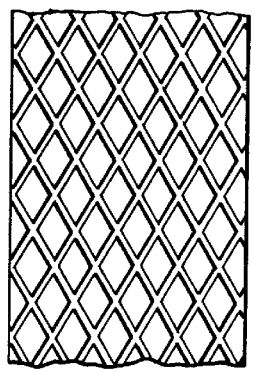
FIG. 12A shows schematically, in plan view, an embodiment of the porous metal layering of the invention, in the form of a sheet of expanded metal.
Figure 12B:
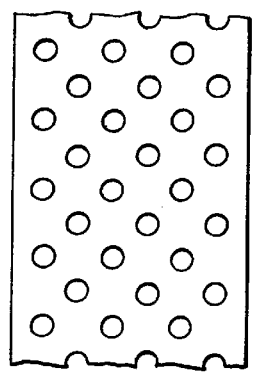
FIG. 12B shows schematically, in plan view, an embodiment of the porous metal layering of the invention, in the form of a sheet of perforated or stamped metal.
Figure 12C:
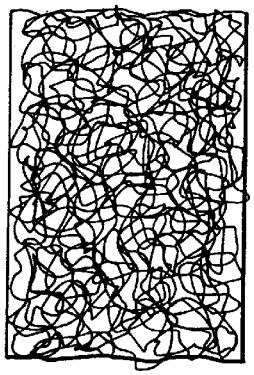
FIG. 12C shows schematically, in plan view, an embodiment of the porous metal layering of the invention, in the form of a non-woven mat of metal.
Figure 12D:
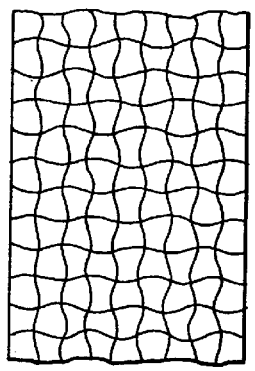
FIG. 12D shows schematically, in plan view, an embodiment of the porous metal layering of the invention, in the form of a woven screen having at least some metal threads.

The foregoing discussion has generally considered that the fastening component to be incorporated into the mold be the hook carrying component. Although this is typical, it need not be the case. Therefore, the loop carrying component can alternatively be the portion of the fastener that is embedded in the molded article. In such case, as shown in FIG. 11, the loop carrying component 1100 will be the component that will include the magnetically attractive porous metal containing layer 1115 embedded into it. Typically, the loop product 1114 is woven or non-woven, but is not processed at a temperature at which it is molten, because that would damage the loops 1116. Thus, in order to embed a metal containing layer 1115 into a portion of a loop containing product, it is typically advantageous to laminate the loop layer to a substrate layer 1117 of a thermoplastic having a melt temperature in the range of the processing temperature. The metal containing layer 1115 can then be embedded into this substrate layer 1117, which is adhered to the base of the loop layer 1114 through the openings in the porous metal containing layer 1115. In fact, the substrate layer 1117 could comprise a regular hook layer, or a modified hook component, with the hooks in the form of anchors, (neither of which are shown in FIG. 11) or substantially flattened. All of the discussion above applies to this loop embodiment also.

The present invention is particularly suited to making magnetically attractive fastening components of any arbitrary shape. This is particularly advantageous, because many methods result only in shapes of a generally rectangular shape, and there are many applications that require other shapes, such as an arcuate shape.

Figure 14:
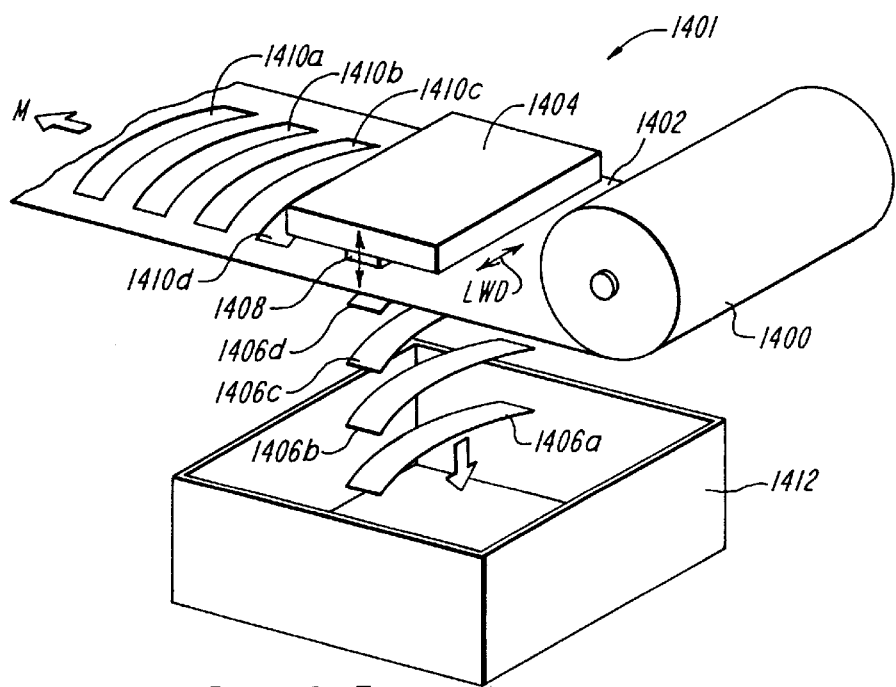
FIG. 14 is a schematic perspective view of a line operation for cutting shaped fastening components.

As shown schematically in FIG. 14, roll 1400 of fastener component with a porous metal containing layer, such as is shown forming in FIGS. 7 or 10, is provided to a shape forming unit 1401. (The metal containing fastening component roll may or may not include a separate backing substrate.) The roll 1400 may be rather wide, such as from one foot (25 cm) to five feet (125 cm). If the porous metal containing layer 1402 is an expanded metal, it would typically be aligned with the long way of the diamond parallel to the width of the roll, such as indicated by the double headed arrow LWD. The web 1402 of fastener component passes a stamping die 1404, which has one or multiple dies 1408 for stamping fastening components of the desired shape. In the case shown, for simplicity, a single die stamps a single shape 1406 on each cycle. Four already cut pieces, $1406_a$, $1406_b$, $1406_c$, and $1406_d$, are shown falling in a stream from the sheet 1402 and the stamping die 1404 into a collection container 1412. The sheet 1402 moves on, in the machine direction, indicated by the arrow M, with holes 1410 cut in the sheet. Three holes, 1410$_a$, 1410$_b$, 1410$_c$ are shown, from which were cut shaped components 1406$_a$, 1406$_b$ and 1406$_c$ respectively.

Thus, any arbitrarily shaped piece can be cut, and the porous metal layer that is embedded within the sheet 1402 will remain intact and operative for its intended purpose. This has a great advantage over the use of rectangular strips of metal shims, which are only conducive to use in rectangular strip pieces. Due to its relatively light weight for its area, porous metal sheets can be incorporated into wide sheets that are later cut to shape as shown, with minimal waste of the costly, heavy metal. Further, using porous metal containing layers, die life is lengthened, especially if the metal is annealed, because there is less metal to die contact than would exist if the metal sheet were continuous, and the metal that is present is not as hard.

The ability to form a component of complex shapes is favorably combined with the invention disclosed in the above mentioned U.S. Ser. No. 08/568,132 SEPARABLE FASTENER HAVING DIE-CUT PROTECTIVE COVER WITH PULL TAB AND METHOD OF MAKING SAME, by the same inventors hereof, which discloses a covered fastening component that may also be of a complicated or non-rectilinear shape. Basically, it entails cutting the cover and the base material simultaneously, and also simultaneously sealing the cover to the base. It is not necessary that there be straight edges or rectilinear shapes for this method of making a covered fastener. Because the present invention can incorporate a metal containing web into a fastener of a non-rectilinear shape, the two inventions may be advantageously combined to form covered, magnetically attractive, or electrically conductive fasteners of an arbitrary, non-rectilinear shape.

Thus, the magnetically attractive embodiment of the invention accomplishes many goals. It provides a magnetically attractive fastening component, without a stiff, unwieldy, costly, heavy, possibly dangerous solid metal shim. Production times are kept low, because the magnetic attractant need not be added as a separate step after the hooks (or loops) are made, being provided at the time the hooks are made. The fastening component, such as the hook component, performs the dual functions of containing the magnetic attractant, and fastening to the mating element. Waste is minimized. No off-line steps are required to remove the element containing the magnetic attractant. There are no known problems of incompatible thermal properties engendered by the magnetically attractive material because the metal layer, being so porous, expands and contracts to virtually the same degree as the base layer. Also, recycling of any layer that protects the hooks, such as a thin cover or an elastomeric sheath, is simplified because, in general, there is no metal near to or incorporated into this element, which can be recycled as a pure material. (This advantage is not present with the embodiment shown in FIG. 15, discussed below, where the porous metal containing layer is included between the tips of the hooks and a protective cover.)

Figure 15:
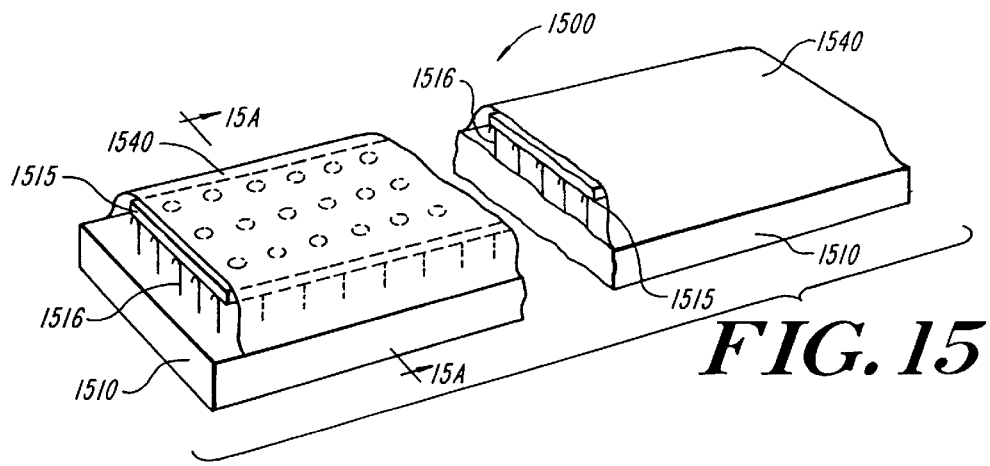
FIG. 15 is a schematic perspective view of an embodiment of the fastening element of the invention having a metal containing layer between the tips of hooks and a protective film cover.
Figure 15A:
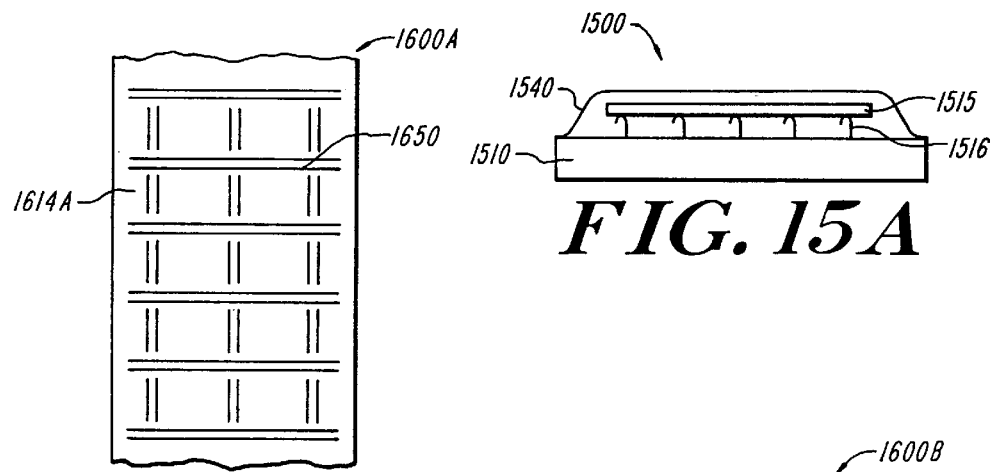
FIG. 15A is a schematic cross-sectional elevation drawing, along the lines 15A—15A of FIG. 15.

Turning now to a discussion of embodiment, illustrated in FIGS. 15 and 15A, the porous metal containing layer may be included between the tips of the hooks and a protective cover. As is mentioned above, in some cases, a protective cover 1540 fully or partially envelopes the hooks 1516 of a fastening component 1500. The protective cover further protects the hooks from fouling by foaming material while the fastening component is being molded into the molded product, such as is shown in FIGS. 2, 3, 4 and 5. Such film covers are discussed fully in the patents identified above, particularly in U.S. Pat. No. 4,693,921. Typically they are clear (as shown in FIG. 15) and very thin. One embodiment of the present invention includes a porous metal containing layer 1515 between the tops of the hooks 1516 and the thin cover 1540. A magnet, such as shown at 226 in FIG. 2, attracts the metal in the metal containing layer 1515 toward it, pulling the thin cover 1540 and thus the base 1510 to which it is attached, snugly against the mold wall, thereby helping to position the fastening component in the mold and to secure it against the forces discussed above that tend to move it.

The metal containing layer 1515 may, as discussed above, be wholly metal, or a composite of non-metal and metal, such as metal powders, fibers, granules etc., interspersed in a plastic matrix.

The foregoing discussion generally considers that a dedicated substrate layer will be separately formed and used to attach the fastening component to the molded article, although it does state that a separate substrate need not be used. In the art known to date, a separate substrate was important to help fix any magnetically attractive member to the fastening components. For instance, a separate substrate layer can be used as part of a sandwich, the fastener component forming the other end of the sandwich, within which is clamped the magnetically attractive metal shim. However, with the present invention having the metal containing layer embedded within the fastening component itself, this function of the substrate is not required.

Figure 16A:
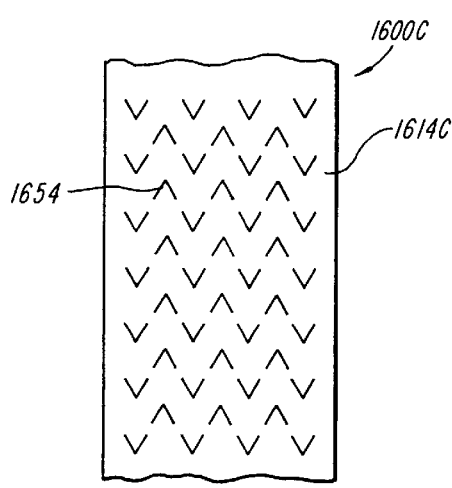
FIG. 16A is a schematic plan view of the non-fastening surface of a preferred embodiment of the invention carrying a generally rectangular three-dimensional pattern thereon.
Figure 16B:
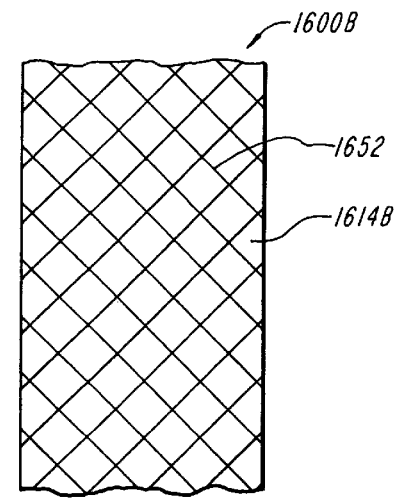
FIG. 16B is a schematic plan view of the non-fastening surface of a preferred embodiment of the invention carrying a generally cross-hatched three-dimensional pattern thereon.
Figure 16C:
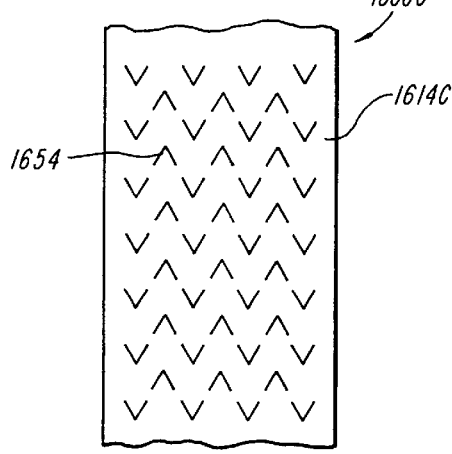
FIG. 16C is a schematic plan view of the non-fastening surface of a preferred embodiment of the invention carrying a generally chevron featured three-dimensional pattern thereon.

The present invention facilitates an elegant solution to the problem of how to anchor the fastening component to the molded product. The non-fastening face of the fastening component, which is the face that faces the molded product, can be textured with a surface that is sufficiently detailed so that the molding material becomes entrained in the surface, and adheres it to the material being molded. The degree of texture is dependent upon the molding material and the material of the fastening component. As shown in FIG. 16A, the pattern may be generally rectangular, or, as shown in FIG. 16B, cross-hatched, or, as shown in FIG. 16C, chevron shaped. Typically the molded product is of a polyurethane foam and the fastening component is a nylon thermoplastic. In addition to the roughened, or textured surface, a chemical tie-coat or adhesion promoter may be necessary.

The textured surface may be created by embossing, i.e., contacting the plastic fastening component to a roll that bears the pattern to be transferred under pressure and temperature conditions suitable to cause the transfer. For instance, as shown in FIGS. 7 and 8, the bottom roll, 704 or 804 respectively, can bear the pattern to be embossed.

The advantages that this structure would provide is the elimination of the cost, time, complication and intricacy of adding a separate substrate layer as well as eliminating its bulk and weight.

Rather than, or in addition to using a textured surface, a chemical coating can be used that increases adhesion between the base material and the article being molded. Such chemical coatings include but are not limited to acrylic or polyurethane coatings.

The feature of the textured back of the non-fastening surface is particularly advantageous when used with the porous metal containing layer, discussed above. However, it can also be used to advantage without that porous metal layer. Thus, a simple fastening component base may be embossed with a three-dimensional pattern as discussed above, thereby eliminating the need for a separate anchoring substrate. This embodiment is useful, for instance, in connection with a solid metal shim, located between the fastening surface and a protective cover. Such a configuration is shown approximately in FIGS. 15 and 15A, but the metal piece is porous, rather than being solid, as intended in the immediate discussion.

The immediately foregoing discussion has focused on an embodiment of the invention that is incorporated into molded products, and includes a magnetically attractive porous metal containing layer. As is mentioned above, there are other opportunities for use of a fastening component having a porous metal containing layer that are not molding processes, where the metal need not be magnetically attractive. These opportunities are typically for use with electrically conductive metal containing components. For instance, a fastening component containing an electrically conductive metal layer can be used for grounding purposes or for shielding electromagnetic radiation.

Such components are virtually identical to those discussed above, but rather than the metal being magnetic, it is electrically conductive. Conductive metals include but are not limited to copper, aluminum, gold, silver and platinum. Otherwise, all of the considerations mentioned above apply. The metal containing layer may be wholly metal, or a composite. The fastening elements may be hooks or loops. The base is typically unitary with the fastening elements. There may or may not be a separate substrate layer, and typically there would not be the same need for one, since no molding operation is involved. The metal layer, may be expanded or perforated sheet metal, or any of the other forms mentioned above. Similarly, any composite layer may be perforated, porous, etc.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The metal composition can be anything that has sufficient magnetic or electrical properties, and that also satisfies requirements for ductility, chemical compatibility, weight, cost, etc. There may be no separate substrate backing layer, or the backing layer may be polymeric, paper, woven, non-woven, etc. There may be embossing on the non-fastening face of the base, rather than a substrate. The metal containing layer may be wholly metal, or it may be a composite of a non-metal, such as a thermoplastic, and metal powder or granules. The metal containing layer may be embedded in either the base of the fastening components, the substrate (if any), or the region (if any) where they are intermixed. The metal containing layer may be associated with either a hook component or a loop component of a separable fastener.

Having described the invention, what is claimed is:

1. A component of a two component separable fastener, said component comprising:
   a. a base comprising;
      i). an extent along a first dimension and an extent along a second dimension;
      ii). a fastening surface and a non-fastening surface;
   b. carried on said fastening surface of said base, a plurality of fastening elements; and
   c. a porous expanded metal web embedded in said base at the non-fastening surface thereof, which web is spaced from the fastening surface of the base and is substantially coextensive with a significant fraction of said extent of the non-fastening surface of said base along said first dimension of said base.

2. A component of a two component separable fastener, said component comprising:
   a. a base comprising;
      i). an extent along a first dimension and an extent along a second dimension;
      ii). a fastening surface and a non-fastening surface, said non-fastening surface of said base comprising a chemical coating that enhances adherence of said base to an article that would be molded adjacent to said base;
   b. carried on said fastening surface of said base, a plurality of fastening elements; and
   c. a porous metal containing web embedded in said base at the non-fastening surface thereof, said porous web being spaced from the fastening surface of the base and being substantially coextensive with a significant fraction of said extent of the non-fastening surface of said base along said first dimension of said base, said porous web comprising a solid structure, with portions removed.

3. The fastener component of claim 1, said expanded metal being substantially flattened.

4. The fastener component of claim 1, said extent of said base along said first dimensions being essentially straight.

5. The fastener component of claim 1, said extent of said base along said first dimensions being essentially non-straight.

6. The fastener component of claim 1, further comprising an anchor substrate adhered to said non-fastening surface of said base.

7. The fastener component of claim 6, said anchor substrate comprising a fabric layer.

8. The fastener component of claim 6, said anchor substrate comprising a polymeric plastic and said porous metal containing web being substantially embedded within said anchor substrate.

9. The fastener component of claim 1, said metal containing web comprising magnetically attractable metal.

10. The fastener component of claim 1, said metal containing web comprising electrically conductive metal.

11. A component of a two component separable fastener, said component comprising:
    a. a base comprising:
       i). an extent along a first dimension and an extent along a second dimension;
       ii) a fastening surface and a non-fastening surface;
    b. carried on said non-fastening surface of said base, an embossed three-dimensional pattern providing a functional texture; and
    c. a porous metal containing web, connected to the non-fastening surface of said base, which web is substantially coextensive with a significant fraction of said extent of the non-fastening surface of said base along said first dimension of said base.

12. A component of a two component separable fastener, said component comprising:
    a. a base comprising:
       i). an extent along a first dimension and an extent along a second dimension,
       ii). a fastening surface and a non-fastening surface, said non-fastening surface of said base comprising a chemical coating that enhances adherence of said base to an article that would be molded adjacent to said base;

b. carried on said fastening surface of said base, a plurality of fastening elements; and c. a porous metal containing web embedded in said base at the non-fastening surface thereof, said web being spaced from the fastening surface of the base and being substantially coextensive with a significant fraction of said extent of the non-fastening surface of said base along said first dimension of said base.

13. A component of a two component separable fastener, said component comprising:

a. a base comprising:
  i). an extent along a first dimension and an extent along a second dimension;
  ii). a fastening surface and a non-fastening surface;

b. carried on said fastening surface of said base, a plurality of fastening elements;

c. secured to said base, facing said fastening surface and extending over the fastening elements, a thin cover; and d. between said cover and said fastening elements, a magnetically attractive expanded metal web that is substantially coextensive with a significant fraction of said base along said first dimension of said base.

14. The fastener component of claim 13, said extent of said base along said first dimension being essentially curved.

15. A component of a two component separable fastener, said component comprising:

a. a base comprising:
  i). an extent along a first dimension and an extent along a second dimension; and
  ii). a fastening surface and a non-fastening surface, b. carried on said fastening surface of said base, a plurality of fastening elements;

c. carried on said non-fastening surface of said base, an embossed three-dimensional pattern that is integral with the material from which said base is formed, the embossed pattern providing a functional texture.

16. The fastening component of claim 15, said pattern comprising a generally rectilinear pattern.

17. The fastening component of claim 15, said pattern comprising a generally chevron featured pattern.

18. The fastener component of claim 2, said extent of said base along said first dimensions being essentially non-straight.

19. The fastener component of claim 2, further comprising an anchor substrate adhered to said non-fastening surface of said base.

20. A component of a two component separable fastener, said component comprising:

a molded base having an extent along a first dimension and an extent along a second dimension, and defining a fastening surface and a non-fastening surface, said fastening surface having a plurality of fastening elements carried thereon; and a porous, magnetic web embedded in said base at the non-fastening surface thereof, which web is spaced from the fastening surface of the base and is substantially coextensive with a significant fraction of said extent of said base along said first dimension of said base.

21. The component of claim 20 further comprising an anchor substrate adhered to the non-fastening face of the base to form a composite structure with the magnetic web laminated between the base and the anchor substrate.

22. The component of claim 20 wherein the magnetic web comprises expanded metal.

23. A component of a two component separable fastener, said component comprising:

a. a base comprising;
  i). an extent along a first dimension and an extent along a second dimension;
  ii). a fastening surface and a non-fastening surface;

b. carried on said fastening surface of said base, a plurality of fastening elements; and c. a porous expanded metal web, connected to the non-fastening surface of said base, which web is substantially coextensive with a significant fraction of said extent of the non-fastening surface of said base along said first dimension of said base, the non-fastening surface of the base formed of material which has been forced through the openings of the web to imbed the web within the base and form the non-fastening surface; and d. an anchor substrate adhered to said non-fastening surface of said base, said anchor substrate comprising a fabric layer.

* * * * *